(12) United States Patent
Hsu

(10) Patent No.: US 11,007,553 B2
(45) Date of Patent: May 18, 2021

(54) CONSERVATION SYSTEM AND METHOD FOR CLEANING PRODUCE THROUGH MIST IMMERSION IN AN ATOMIZED AQUEOUS MEDIUM

(71) Applicant: Gene Hsu, San Gabriel, CA (US)

(72) Inventor: Gene Hsu, San Gabriel, CA (US)

(*) Notice: Subject to any disclaimer, the term of this patent is extended or adjusted under 35 U.S.C. 154(b) by 258 days.

(21) Appl. No.: 15/906,774

(22) Filed: Feb. 27, 2018

(65) Prior Publication Data
US 2019/0262873 A1   Aug. 29, 2019

(51) Int. Cl.
| | | |
|---|---|---|
| A23B 7/04 | (2006.01) |
| B08B 3/12 | (2006.01) |
| B01F 3/04 | (2006.01) |
| B08B 3/04 | (2006.01) |
| B08B 3/02 | (2006.01) |

(52) U.S. Cl.
CPC ............. B08B 3/12 (2013.01); A23B 7/04 (2013.01); B01F 3/0407 (2013.01); B08B 3/02 (2013.01); B08B 3/04 (2013.01); B08B 3/047 (2013.01); A23V 2002/00 (2013.01)

(58) Field of Classification Search
None
See application file for complete search history.

(56) References Cited

U.S. PATENT DOCUMENTS

| | | | | |
|---|---|---|---|---|
| 4,739,781 A | * | 4/1988 | Casoli | A47L 15/0086 134/115 R |
| 5,145,113 A | * | 9/1992 | Burwell | B05B 7/0416 239/102.2 |
| 7,748,393 B2 | * | 7/2010 | DiPanni | A47J 43/24 134/111 |
| 2006/0102193 A1 | * | 5/2006 | Lyubchik | A23N 12/02 134/1 |
| 2011/0232312 A1 | * | 9/2011 | Bortoletto | F25D 17/042 62/274 |

* cited by examiner

*Primary Examiner* — Amber R Orlando
*Assistant Examiner* — Philip A Dubois

(57) ABSTRACT

A conservation system and method for cleaning produce through mist immersion in an atomized aqueous medium. The system and method provides a tank for receiving the produce to soak and rinse an aqueous cleaning medium, so as to remove and dissolve residues and contaminants from rough or smooth surfaces of the produce. While cleaning the produce, the system and method is effective for conservation of water, liquids or other mediums, by not fully soaking the produce in a medium, but rather by uniformly immersing the produce in tiny droplets of atomized aqueous medium for a predetermined duration. After this droplet immersion, the produce is then rinsed and ready for consumption. The tank provides an air nozzle for aerating aqueous medium and an ultrasonic device for atomizing aqueous medium between 1 μm and 15 μm. The produce is supported on a basket while being soaked in the aerated and atomized aqueous medium.

2 Claims, 3 Drawing Sheets

CONSERVATION SYSTEM AND METHOD FOR CLEANING PRODUCE THROUGH MIST IMMERSION IN AN ATOMIZED AQUEOUS MEDIUM

FIELD OF THE INVENTION

The present invention relates generally to a conservation system and method for cleaning produce through a mist immersion in an atomized aqueous medium. More so, the present invention relates to a system and method that provides a tank for cleaning produce to remove and dissolve residues and contaminants from rough or smooth surfaces of the produce, while also conserving water, liquid or other mediums, by not fully soaking the produce in water, but rather by uniformly immersing the produce in tiny droplets of atomized aqueous medium, generally between 1 μm and 15 μm, for a predetermined duration, and then rinsing the produce thereafter for consumption.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, fresh produce, even organic, can harbor residual pesticides, dirt or harmful microorganisms on the surface. Vegetable washes may either be a number specially-marketed commercial brands, or they may be home recipes. Commercial vegetable washes generally contain surfactants, along with chelating agents, antioxidants, and other agents. A vegetable wash is a cleaning product designed to aid in the removal process of dirt, wax and pesticides from fruit and vegetables before they are consumed.

It is known in the art that chlorine or hydrochloric acid are frequently used as bactericides and are also used universally as cleaning agents. Thus, in some embodiments, chlorine may be added to the aqueous medium, or chlorine may not be added to the aqueous medium. Food-grade surfactants also may be added to the aqueous medium. The aqueous medium may be part of a pre-wash, washing, or rinsing systems. Further, the produce may be pre-harvest or post-harvest.

Generally, water rinse method is effective for all fruits and vegetables. However, some types of vegetables, including broccoli, lettuce leaves, or spinach, often require additional attention and cleaning. A soaking and cleaning process may also be used for fruits and vegetables with a lot of surface area (such as strawberries or blueberries), that are attached or packed tightly (like grapes) or have deep crevices (cauliflower, broccoli, and leafy greens). Other washing means, involving agitation in a washing machine, or washing in distilled water to rinse and soak the produce.

Other proposals have involved washing produce. The problem with these produce washing methods is that they use a large amount of water for soaking. Also, the produce is not fully immersed in the washing medium due to the water surface tension. Even though the above cited produce washing means meet some of the needs of the market, a conservation system and method provides a tank for soaking and cleaning produce to remove and dissolve residues and contaminants from rough or smooth surfaces of the produce, while also conserving water, by not fully soaking the produce in water, but rather by uniformly immersing the produce in tiny droplets of atomized aqueous medium, generally between 1 μm and 15 μm, for a predetermined duration, and then rinsing the produce thereafter for consumption, ideal for soaking and cleaning the produce more effectively. The produce can then be consumed after the soaking and cleaning process. This conservation can be combined with many more sophisticated cleaning processes if desired.

SUMMARY

Illustrative embodiments of the disclosure are generally directed to a conservation system and method for cleaning produce through mist immersion in an atomized aqueous medium. The system and method provides a tank for soaking and cleaning produce, so as to remove and dissolve residues and contaminants from rough or smooth surfaces of the produce. While cleaning the produce, the system and method is effective for conserving water, by not fully soaking the produce in water, but rather by uniformly immersing the produce in tiny droplets of atomized aqueous medium, generally between 1 μm and 15 μm, for a predetermined duration. After this droplet immersion, the produce is then rinsed and ready for consumption. The tank provides an air nozzle for aerating the atomized aqueous medium and an ultrasonic device for atomizing the aqueous medium between 1 μm and 15 μm. The produce may be supported by a basket on a rack while being soaked in the aerated and atomized aqueous medium.

The system and method is useful for 1) conquering the liquid surface tension to enhance the soaking effect; 2) eliminating absorption of contaminants throughout the stem end of produce when soaking fully in water or aqueous medium; 3) avoiding microbial contamination and to reduce the potential for the spread of resistant organisms; 4) water and energy conservation; and whereby after the atomized mist immersion process and rinsing, the produce is ready for consumption, with any more sophisticated cleaning procedure being added if desired.

In one aspect, a conservation method for soaking and cleaning produce through mist immersion in atomized particles of an aqueous medium, comprises:
  providing a tank, the tank defined by a sidewall forming an inner volume and an upper opening, the tank comprising a lid for accessing the inner volume;
  cooling the produce in the refrigerator at a temperature below 5° Celsius (take out from refrigerator);
  loading the produce with a stem end up and leaf end down position for leafy vegetables;
  introducing an aqueous medium into the inner volume of the tank;
  atomizing the aqueous medium between 1 μm and 15 μm with an ultrasonic device, the ultrasonic device generating ultrasonic vibrations through the aqueous medium contained in the tank at a predetermined vibration energy level, and with a predetermined frequency, intensity, duration, and direction;
  uniformly immersing the produce in the atomized aqueous medium for a predetermined duration, the predetermined duration consisting of mist-atomizing for at least one minute at the beginning of a ten minute mist immersion period, and for at least two immersions in a standard soaking cycle;
  draining the aqueous medium from the inner volume of the tank;

regulating flow of the aqueous medium with at least one flow valve; and rinsing the produce.

In one non-limiting embodiment, the rinse step of the conservation method in paragraph 009 for soaking and cleaning produce includes the following steps:

Intaking water from the bottom of the tank and a shower head at the top of the tank;

Continuing to intake water until the selected volume reaches the top of the produce;

Stopping the bottom intake and begin to drain the water;

Continue spraying water with the shower head until at least 15 seconds after the water drains out completely from the tank; and The draining volume is bigger than the sum of the 2 intake waters inlets.

In another aspect, the method further includes a step of aerating the atomized aqueous medium.

In another aspect, an air pump and an air nozzle aerate the atomized aqueous medium.

In another aspect, the tank has dimensions of at least 18 cm height, 15 cm length, and 15 cm width.

In another aspect, the tank comprises a removeable base rack.

In another aspect, the at least one basket comprises one large basket and three small baskets in accordance with the size and the shape of the produce.

In another aspect, an inlet introduces the aqueous medium into the tank.

In another aspect, the inlet comprises a spray nozzle mounted on the lid and means for supplying the aqueous medium to the nozzle during the rinsing cycle.

In another aspect, at least one flow valve regulates the inlet, whereby the inlet valve regulates aqueous medium level in the inner volume of the tank.

In another aspect, at least one outlet enables passage of the aqueous medium out the inner volume of the tank.

In another aspect, a drainage valve enables drainage of the aqueous medium through the outlet, whereby the drainage valve regulates aqueous medium level in the inner volume of the tank.

In another aspect, at least one bottom rack is standing 3 cm above the bottom of the tank to support the basket or to support the produce directly if the basket is not used.

In another aspect, an electric controller and a control panel control the ultrasonic device, the intake, drainage and working cycles.

In another aspect, the ultrasonic device comprises an ultrasonic transducer.

In another aspect, the predetermined duration for immersing the produce in the atomized aqueous medium is mist-atomizing for at least one minute at the beginning of a ten minute mist immersion period, and for at least two immersions in a standard soaking cycle;

In another aspect, the tank is fabricated from at least one of the following: clear plastic, metal, glass, fiberglass, or another see through material.

In another aspect, the aqueous medium is water, or a disinfectant solution, or both.

In another aspect, the final rinse step consists of water application.

One objective of the present invention is to conserve water when cleaning produce.

Another objective is to atomize the aqueous medium to immerse the produce in a mist.

Yet another objective is to reduce the physical stress of spraying the produce with strong stream of aqueous medium.

Yet another objective is to provide a washing system and method for the removal of spray residue from fruits and vegetables, more effective as to the amount of spray residue removed than has heretofore been accomplished by commercial washers.

Yet another objective is to provide a washing system and method capable of removing spray residue of varied character from fruits and vegetables.

Yet another objective is to require less temperature and less-concentration of the chemicals or washing solutions than has heretofore been possible for given results.

Yet another objective is to provide a washing system and method for removing spray residue from fruits and vegetables which will provide, automatically, without the addition of chemicals, a final rinse water application that will be slightly alkaline or neutral in character rather than acid in reaction.

Yet another objective is to provide an inexpensive to manufacture tank for cleaning produce.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
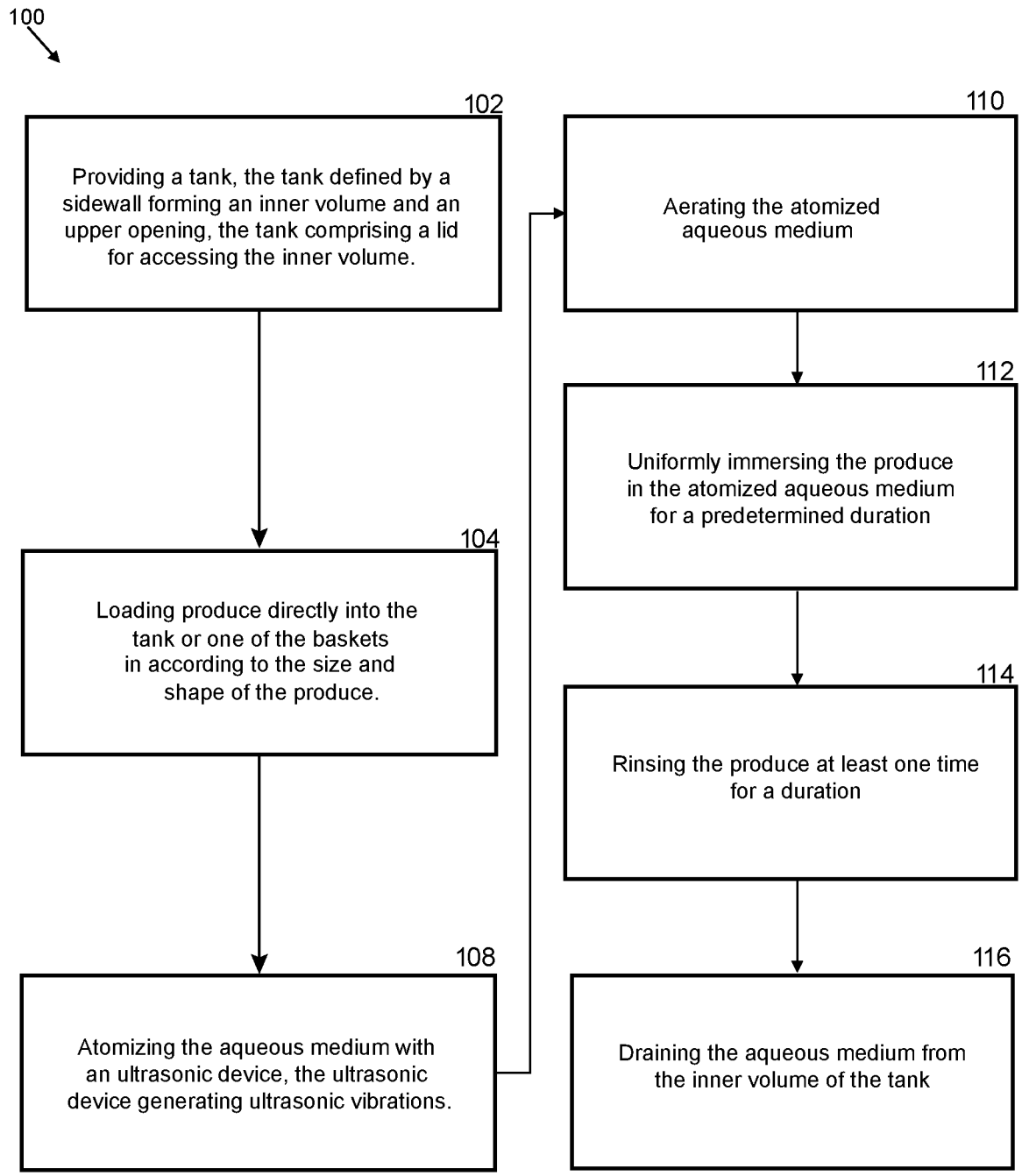
FIG. 1 illustrates a flowchart of an exemplary conservation method for cleaning produce through mist immersion in an atomized aqueous medium, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A conservation system 200 and method 100 for cleaning produce through mist immersion in an atomized aqueous medium is referenced in FIGS. 1-4. As FIG. 1 references, the conservation system 200 for washing and disinfecting produce through mist immersion, hereafter "system 200" provides a tank 202 for cleaning and sanitizing produce, so as to remove and dissolve residues and contaminants from rough or smooth surfaces of the produce. An industrial use of the present invention includes both the system 200 and the method 100 together.

Those skilled in the art will recognize that produce, such as fruits and vegetables, can be covered with residues of contaminants such as mud, biological dirt, microbiological flora like mold, worms, bacteria, germs, and chemicals such as herbicides, pesticides, fungicides, fertilizer remains etc. The system and method of the present invention helps remove and dissolve such contaminants from rough or smooth surfaces of fruit and vegetables of all types, while minimizing use of water and other washing aqueous medium known in the art.

The step of atomization creates an aqueous medium having smaller particles, and spread out more uniformly, in which the produce is soaked. Inside the tank 202, the produce is supported on a plurality of baskets 212a, 212b, 212c that are disposed in a stacked relationship on removeable racks 216 (FIG. 4), while being soaked in the atomized aqueous medium.

In some embodiments, the tank 202 provides an air nozzle 224 for aerating the atomized aqueous medium. An air pump 222 may also be used to generate air for the air nozzle 224. The tank 202 also provides an ultrasonic device 226 for atomizing the aqueous medium to particles sized between 1 µm and 15 µm.

While cleaning the produce, the system 200 is effective for conserving water, by not fully soaking the produce in water, but rather by uniformly immersing the produce in tiny droplets of aerated and atomized aqueous medium for a predetermined duration. After this droplet immersion, the produce is then rinsed with the aqueous medium, set for drying, and is then ready for consumption.

In one non-limiting embodiment, the conservation method for cleaning produce includes the following steps:
Intaking water from the bottom of the tank and a shower head at the top of the tank;
Continuing to intake water until the selected volume reaches the top of the produce;
Stopping the bottom intake and begin to drain the water;
Continue spraying water with the shower head until at least 15 seconds after the water drains out completely from the tank; and
The draining volume is bigger than the sum of the 2 intake waters inlets.

In another non-limiting embodiment, the conservation method for cleaning produce includes the following steps:
Taking produce out of a refrigerator;
Conquering the liquid surface tension to enhance the soaking effect in the cleaning process;
Eliminating the absorption of contaminants through a steam end of the produce when in regular soaking process;
Conserving water and energy; and
Consuming the produce after the atomized mist immersion and rinse process, whereby any more sophisticated cleaning procedure can be added if desired.

As FIG. 1 references, the conservation method 100 for cleaning produce through mist immersion in an atomized aqueous medium, hereafter "method 100", comprises an initial Step 102 of providing a tank 202. Looking at FIG. 2, the tank 202 is defined by a top end 238, a bottom end 240, and a sidewall 204 forming an inner volume 208 and an upper opening 210. In one non-limiting embodiment, the tank 202 has dimensions of at least 18 cm height, 15 cm length, and 15 cm width. The tank 202 may have a generally elongated cubicle shape. Though in other embodiments, other shapes and dimensions may be used. Suitable materials for the tank 202 may include, without limitation, clear plastic, metal, glass, fiberglass and various see through materials.

Figure 2:
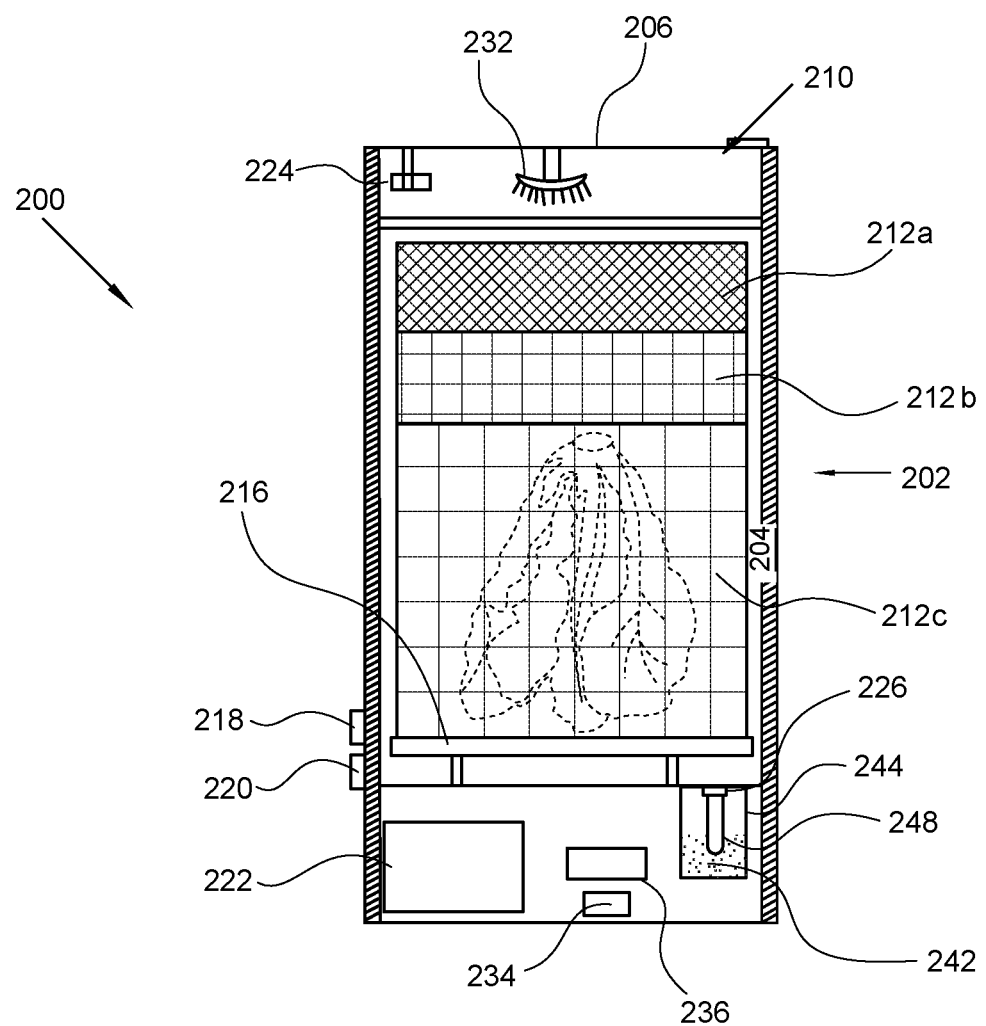
FIG. 2 illustrates a sectioned front view of an exemplary tank of a conservation system for cleaning produce through mist immersion in an atomized aqueous medium, in accordance with an embodiment of the present invention.

A lid 206 is operable at the upper opening 210 of the tank 202 (FIG. 2). The lid 206 is hinged or slidable to enable access to the inner volume 208 of the tank 202. The lid 206 may be opened to load produce or remove produce from the inner volume 208 of the tank 202. Further, at least one rack 216 is disposed in a stacked relationship in the tank 202. In some embodiments, a plurality of baskets 212a, 212b, 212c may be arranged on the at least one rack 216 in a stacked relationship inside the tank 202. The baskets 212a-c are configured to receive the produce while being soaked, washed, sanitized, rinsed, and dried. The baskets 212a-c may be perforated to enable communication between produce and aqueous medium. In this manner, the produce soaks in the aerated atomized aqueous medium.

In one embodiment, one large basket 212c holds larger vegetables, while two or three small baskets 212a, 212b may be used for retaining smaller produce, such as berries. Though in other embodiments, other numbers and dimensions of baskets 212a-c may be used. Another step of the method 100 may include cooling the produce up to 5° Celsius.

In some embodiments, the method 100 includes a Step 104 of loading produce in the baskets 212a-c. The baskets are supported on at least one rack 216 disposed in a stacked relationship in the tank 202. In some embodiments, the aqueous medium may be in communication with the baskets 212a-c; and thereby the produce, while entering the inner volume 208 of the tank 202.

In other embodiments, at least one flow valve 228 regulates the flow of aqueous medium through the inlet 218 and 232. In another embodiment, at least one aqueous medium level sensor, regulator, or indicator 214 regulates the aqueous medium level. In yet another embodiment, the inlet 218 and 232, such as a spray nozzle, may be mounted on the lid 206 to introduce the aqueous medium into the inner volume 208 of the tank 202. The inlet 218 and 232 may include, without limitation, a shower head or a nozzle.

In one possible embodiment, the spray nozzle that makes up the inlet 218 is an impingement nozzle that allows the aqueous medium to exit the nozzle in a straight stream through a very small orifice—typically 0.008" or about 200

μm or microns—and immediately collide with a solid pin which effectively atomizes the water into tiny droplets, usually between 1 μm and 15 μm. In another possible embodiment, the spray nozzle for the inlet 232 is a nozzle that provides droplets ranging from a few microns up to about 50 μm with the majority of the droplets being larger than 10 μm.

In some embodiments, the aqueous medium may include purified water, or a disinfectant solution, or both. It is known in the art that appropriate use of antimicrobial agents in washing produce is necessary to avoid microbial contamination and to reduce the potential for the spread of resistant organisms. Chlorine or hydrochloric acid are frequently used as bactericides and are also used universally as cleaning agents. Thus, in some embodiments, chlorine may be added to the aqueous medium, or chlorine may not be added to the aqueous medium. Food-grade surfactants also may be added to the aqueous medium. The aqueous medium may be part of a pre-wash, washing, or rinsing systems. Further, the produce may be pre-harvest or post-harvest.

A Step 108 comprises atomizing the aqueous medium between 1 μm and 15 μm with an ultrasonic device 226. As the aqueous medium enters the inner volume 208 of the tank 202, the atomization occurs. In this manner, the aqueous medium is both aerated, and atomized to create a mist for soaking the produce. In one embodiment, the ultrasonic device 226 generates ultrasonic vibrations through the aqueous medium contained in the tank 202 at a predetermined vibration energy level, and with a predetermined frequency, intensity, duration, and direction. These factors may be adjusted to accommodate different types of produce.

A Step 110 comprises aerating the aqueous medium. As the aqueous medium enters the inner volume 208 of the tank 202, very light pressurized air strikes the atomized aqueous medium, causing the aeration. The aqueous medium may be aerated with air from an air nozzle 224. An air pump 222 may be used to generate air for the air nozzle 224. The pressure of the air may be regulated, depending on the amount of aqueous medium entering the tank 202.

In one alternative embodiment, the conservation system 200 is configured so that the ultrasonic device 226 introduces into the tank 202, an independent capillary water supply 242 utilizing a capillary mechanism 244. Thus, as the water supply enters through capillary means, the water is atomized. The capillary mechanism 244 may utilize a wick 247, which is longitudinally placed in the capillary mechanism. The wick 248 protrudes to be contacted with the ultrasonic device 226. As with the previously discussed aqueous medium from the inlet 218, 232, the ultrasonic device 226 works to atomize the water introduced through the capillary mechanism 244.

As FIG. 1 illustrates, the tank 202 comprises a base rack 216 disposed at a lower end of the tank 202. The base rack 216 is configured to support the baskets. In this manner, the ultrasonic device 226 is below the rack 216 that supports the basket 212a-c. Though in other arrangements, the base rack 216 may be above the baskets 212a-c. In another embodiment, an electric controller 234 and a control panel 236 control the ultrasonic device 226, and other components of the tank 202. The electric controller 234 may utilize various wires, circuits, chips, resistors, and transistors known in the art. The control panel 236 may include a digital screen, an input, such has a keyboard, and a command means.

A Step 112 may include uniformly immersing the produce in the atomized aqueous medium for a predetermined duration. In one embodiment, the predetermined duration for immersing the produce in the atomized aqueous medium is mist-atomizing for at least one minute at the beginning of a ten minute mist immersion period, and for at least two immersions in a standard soaking cycle. Though in other embodiments, the time of the immersion may be increased or decreased to accommodate different types of produce.

A final Step 114 comprises rinsing the produce at least one time. Though in other embodiments, the cycle of the rinse may be increased or decreased to accommodate different types of produce. The duration for rinsing may be increased or decreased, depending on the type of produce. After rinsing, the produce is set to dry and ready for consumption. The rinsing process may be performed with a rinsing inlet 232, such as a shower head, that overhangs over the baskets and inlet 218 that discharges water, cleaning agents, or other sanitizing liquids directly onto the produce after soaking in the atomized aqueous medium. The drainage of aqueous medium may occur after washing, after rinsing, or both. In any case, rinsing is necessary to complete the cleaning of the produce.

Figures 3, 4:
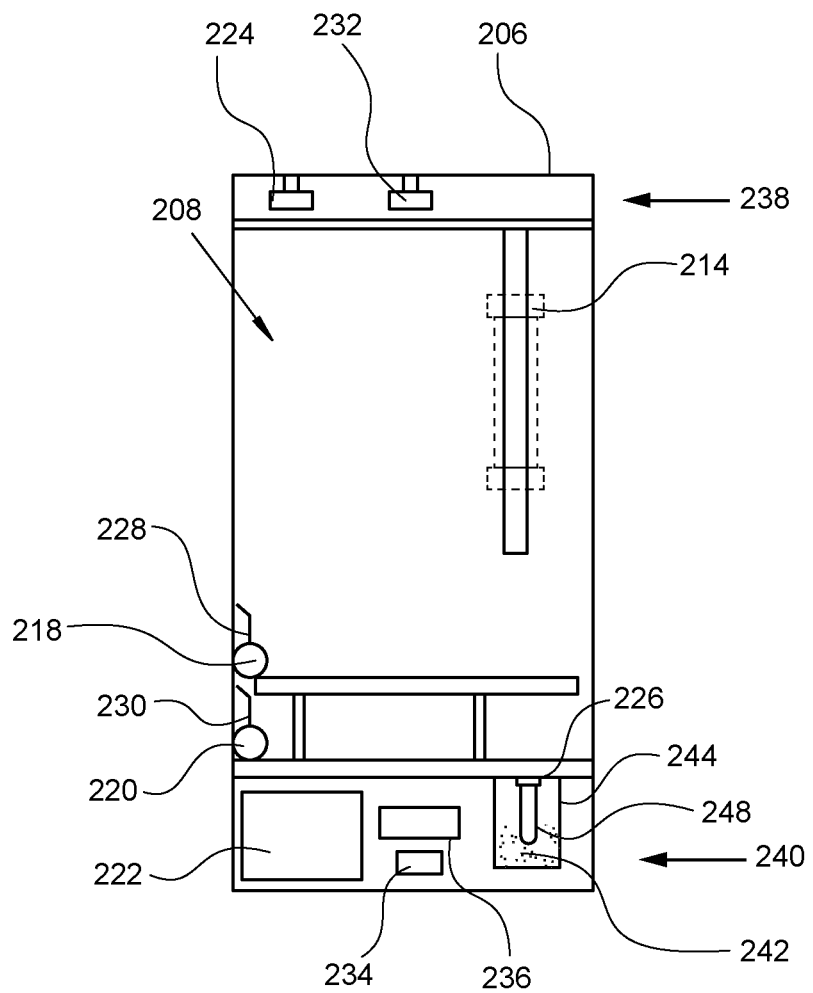
FIG. 3 illustrates a sectioned side view of an exemplary tank of a conservation system for cleaning produce through mist immersion in an atomized aqueous medium, in accordance with an embodiment of the present invention.
FIG. 4 illustrates a top view of the rack, in accordance with an embodiment of the present invention.

In one embodiment, a Step 116 includes draining the aqueous medium from the inner volume 208 of the tank 202. The drainage of aqueous medium may occur after washing, after rinsing, or both. FIG. 3 shows at least one drainage valve 230 used to drain the aqueous medium from the inner volume 208 of the tank 202. In one possible embodiment, at least one outlet 220 enables passage of the aqueous medium out the inner volume 208 of the tank 202. The outlet 220 may include a drainage valve 230 that regulates the volume of aqueous medium level in the inner volume 208 of the tank 202. In one alternative embodiment, the method 100 comprises a step of regulating flow level of the aqueous medium with at least one aqueous medium level sensor, regulator or indicator 214.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A conservation method for soaking a produce through mist immersion in an atomized aqueous medium, the method consisting of:
   providing a tank, the tank defined by a sidewall forming an inner volume and an upper opening with a lid, the tank comprising a lid for accessing the inner volume;
   loading the produce in the tank and covering the lid on the upper opening of the tank;
   introducing an aqueous medium into the tank through at least two inlets located at a top end and a bottom end of the tank;
   generating ultrasonic vibrations from at least one ultrasonic device to atomize the aqueous medium at a predetermined vibration energy level, and with a predetermined frequency, intensity, duration, and direction;
   aerating the atomize aqueous medium by air from an air nozzle and generating air by an air pump in the tank;
   uniformly immersing the produce in the atomized aqueous medium in the tank for a predetermined duration, the predetermined duration being mist-atomizing for at least one minute at the beginning of a ten-minute mist immersion period;

rinsing the produce by a spray nozzle located at a top end of the tank and an inlet located at a bottom end of the tank;

draining the aqueous medium from the inner volume of the tank through at least two outlets in the tank.

2. A conservation method for soaking a produce through mist immersion in an atomized aqueous medium, the method consisting of:

providing a tank, the tank defined by a sidewall forming an inner volume and an upper opening with a lid, the tank comprising a lid for accessing the inner volume;

loading the produce in the tank and covering the lid on the upper opening of the tank;

introducing an aqueous medium with a capillary water supply disposed in a container, and a wick located in the container is contacted with at least one ultrasonic device;

generating ultrasonic vibrations from the ultrasonic device to atomize the aqueous medium at a predetermined vibration energy level, and with a predetermined frequency, intensity, duration, and direction;

aerating the atomize aqueous medium by air from an air nozzle and generating air by an air pump in the tank;

uniformly immersing the produce in the atomized aqueous medium in the tank for a predetermined duration, the predetermined duration being mist-atomizing for at least one minute at the beginning of a ten-minute mist immersion period;

rinsing the produce by a spray nozzle located at a top end of the tank and an inlet located at a bottom end of the tank;

draining the aqueous medium from the inner volume of the tank through at least two outlets in the tank.

* * * * *